US011812430B2

(12) United States Patent
Khoshnevisan et al.

(10) Patent No.: US 11,812,430 B2
(45) Date of Patent: Nov. 7, 2023

(54) AUTONOMOUS DETERMINATION OF SCHEDULING PARAMETERS FOR DYNAMICALLY SCHEDULED UPLINK TRANSMISSIONS

(71) Applicant: QUALCOMM Incorporated, San Diego, CA (US)

(72) Inventors: Mostafa Khoshnevisan, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 117 days.

(21) Appl. No.: 17/195,386

(22) Filed: Mar. 8, 2021

(65) Prior Publication Data

US 2021/0385838 A1    Dec. 9, 2021

Related U.S. Application Data

(60) Provisional application No. 63/035,384, filed on Jun. 5, 2020.

(51) Int. Cl.
| | |
|---|---|
| *H04W 72/1268* | (2023.01) |
| *H04W 72/21* | (2023.01) |
| *H04W 72/1273* | (2023.01) |
| *H04W 72/0453* | (2023.01) |
| *H04W 76/27* | (2018.01) |
| *H04W 72/0446* | (2023.01) |

(Continued)

(52) U.S. Cl.
CPC ....... *H04W 72/1273* (2013.01); *H04L 1/1819* (2013.01); *H04W 72/0446* (2013.01); *H04W 72/0453* (2013.01); *H04W 72/1268* (2013.01); *H04W 72/21* (2023.01); *H04W 72/535* (2023.01); *H04W 76/27* (2018.02)

(58) Field of Classification Search
None
See application file for complete search history.

(56) References Cited

U.S. PATENT DOCUMENTS

| | | | |
|---|---|---|---|
| 2013/0102342 A1* | 4/2013 | Tesanovic | H04B 7/0658 455/39 |
| 2014/0161084 A1* | 6/2014 | Yang | H04L 1/1822 370/329 |

(Continued)

*Primary Examiner* — The Hy Nguyen
(74) *Attorney, Agent, or Firm* — QUALCOMM Incorporated

(57) ABSTRACT

Various aspects of the present disclosure generally relate to wireless communication. In some aspects, a user equipment (UE) may receive a downlink control information (DCI) message that dynamically schedules one or more physical uplink shared channel (PUSCH) transmissions. The UE may autonomously determine a set of scheduling parameters for the one or more PUSCH transmissions that are dynamically scheduled by the DCI message. The UE may transmit the one or more PUSCH transmissions based at least in part on the set of scheduling parameters. Furthermore, in some aspects, uplink control information (UCI) may be multiplexed onto each of the one or more PUSCH transmissions. For example, the UCI multiplexed onto each PUSCH transmission may indicate the set of scheduling parameters autonomously determined for the respective PUSCH transmission. Numerous other aspects are provided.

29 Claims, 7 Drawing Sheets

(51) Int. Cl.
H04L 1/1812 (2023.01)
H04W 72/50 (2023.01)

(56) References Cited

U.S. PATENT DOCUMENTS

| | | | |
|---|---|---|---|
| 2018/0242317 A1* | 8/2018 | Marinier | H04L 5/0053 |
| 2019/0268935 A1* | 8/2019 | Talarico | H04L 1/1819 |
| 2020/0053799 A1* | 2/2020 | Jeon | H04W 16/14 |
| 2020/0383095 A1* | 12/2020 | Moon | H04L 5/0094 |
| 2020/0383132 A1* | 12/2020 | Yang | H04W 74/0808 |
| 2021/0044391 A1* | 2/2021 | Lunttila | H04W 28/04 |
| 2021/0058960 A1* | 2/2021 | Zhao | H04L 5/0053 |
| 2021/0345408 A1* | 11/2021 | Loehr | H04W 72/14 |
| 2021/0376959 A1* | 12/2021 | Yang | H04L 1/1896 |
| 2022/0116152 A1* | 4/2022 | Iyer | H04L 1/188 |
| 2022/0232643 A1* | 7/2022 | Matsumura | H04W 74/0841 |
| 2022/0417978 A1* | 12/2022 | Zhu | H04W 72/232 |

* cited by examiner

AUTONOMOUS DETERMINATION OF SCHEDULING PARAMETERS FOR DYNAMICALLY SCHEDULED UPLINK TRANSMISSIONS

CROSS-REFERENCE TO RELATED APPLICATION

This Patent Application claims priority to U.S. Provisional Patent Application No. 63/035,384, filed on Jun. 5, 2020, entitled "AUTONOMOUS DETERMINATION OF SCHEDULING PARAMETERS FOR DYNAMICALLY SCHEDULED UPLINK TRANSMISSIONS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for autonomous determination of scheduling parameters for dynamically scheduled uplink transmissions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include: receiving a downlink control information (DCI) message that dynamically schedules one or more physical uplink shared channel (PUSCH) transmissions; autonomously determining a set of scheduling parameters for the one or more PUSCH transmissions dynamically scheduled by the DCI message; and transmitting the one or more PUSCH transmissions based at least in part on the set of scheduling parameters, wherein uplink control information (UCI) is multiplexed onto each of the one or more PUSCH transmissions to indicate the set of scheduling parameters autonomously determined for each respective PUSCH transmission.

In some aspects, a UE for wireless communication may include a memory and one or more processors, coupled to the memory, configured to: receive a DCI message that dynamically schedules one or more PUSCH transmissions; autonomously determine a set of scheduling parameters for the one or more PUSCH transmissions dynamically scheduled by the DCI message; and transmit the one or more PUSCH transmissions based at least in part on the set of scheduling parameters, wherein UCI is multiplexed onto each of the one or more PUSCH transmissions to indicate the set of scheduling parameters autonomously determined for each respective PUSCH transmission.

In some aspects, a non-transitory computer-readable medium may store one or more instructions for wireless communication. The one or more instructions, when executed by one or more processors of a UE, may cause the one or more processors to: receive a DCI message that dynamically schedules one or more PUSCH transmissions; autonomously determine a set of scheduling parameters for the one or more PUSCH transmissions dynamically scheduled by the DCI message; and transmit the one or more PUSCH transmissions based at least in part on the set of scheduling parameters, wherein UCI is multiplexed onto each of the one or more PUSCH transmissions to indicate the set of scheduling parameters autonomously determined for each respective PUSCH transmission.

In some aspects, an apparatus for wireless communication may include: means for receiving a DCI message that dynamically schedules one or more PUSCH transmissions; means for autonomously determining a set of scheduling parameters for the one or more PUSCH transmissions dynamically scheduled by the DCI message; and means for transmitting the one or more PUSCH transmissions based at least in part on the set of scheduling parameters, wherein UCI is multiplexed onto each of the one or more PUSCH transmissions to indicate the set of scheduling parameters autonomously determined for each respective PUSCH transmission.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
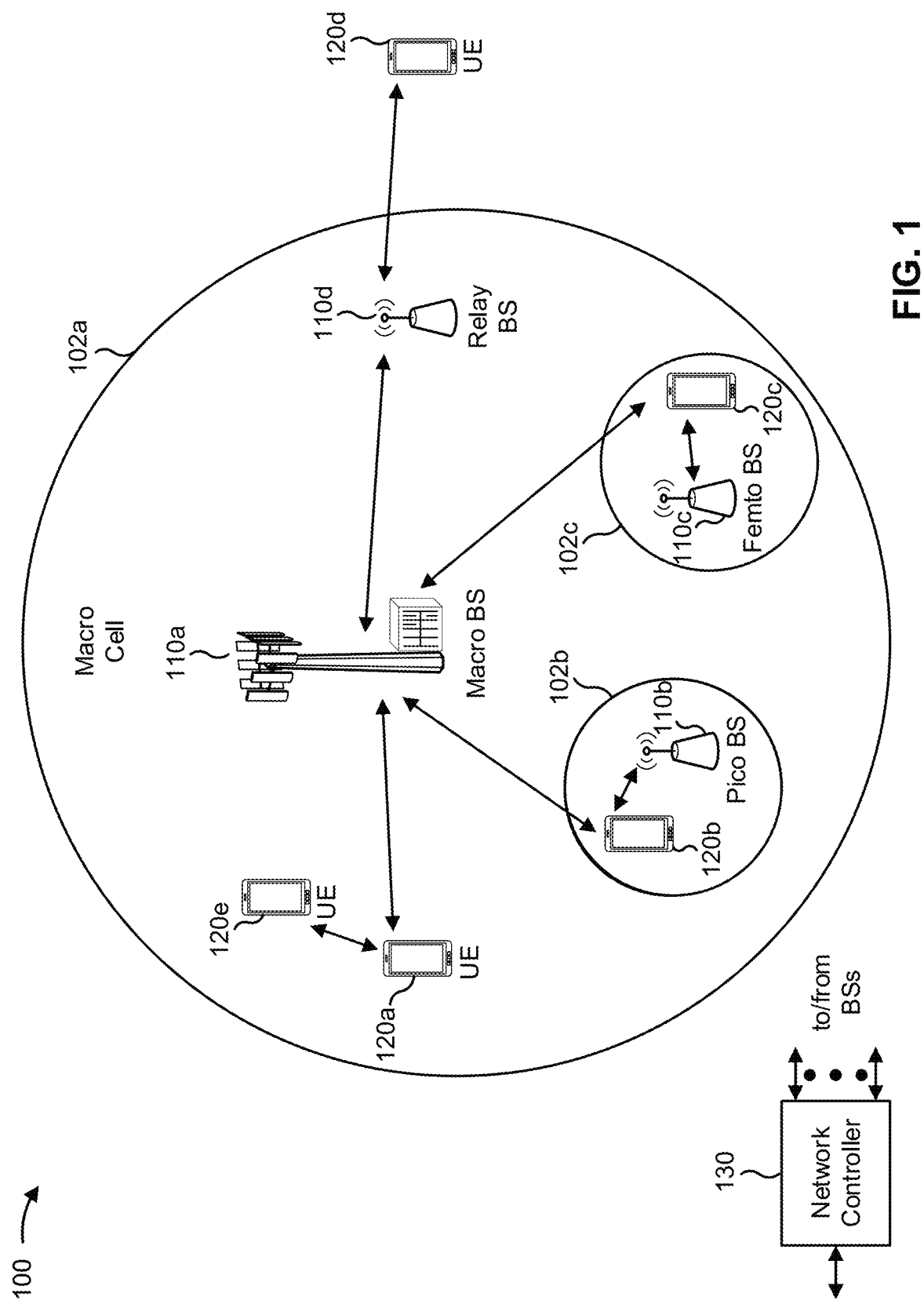
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment. UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
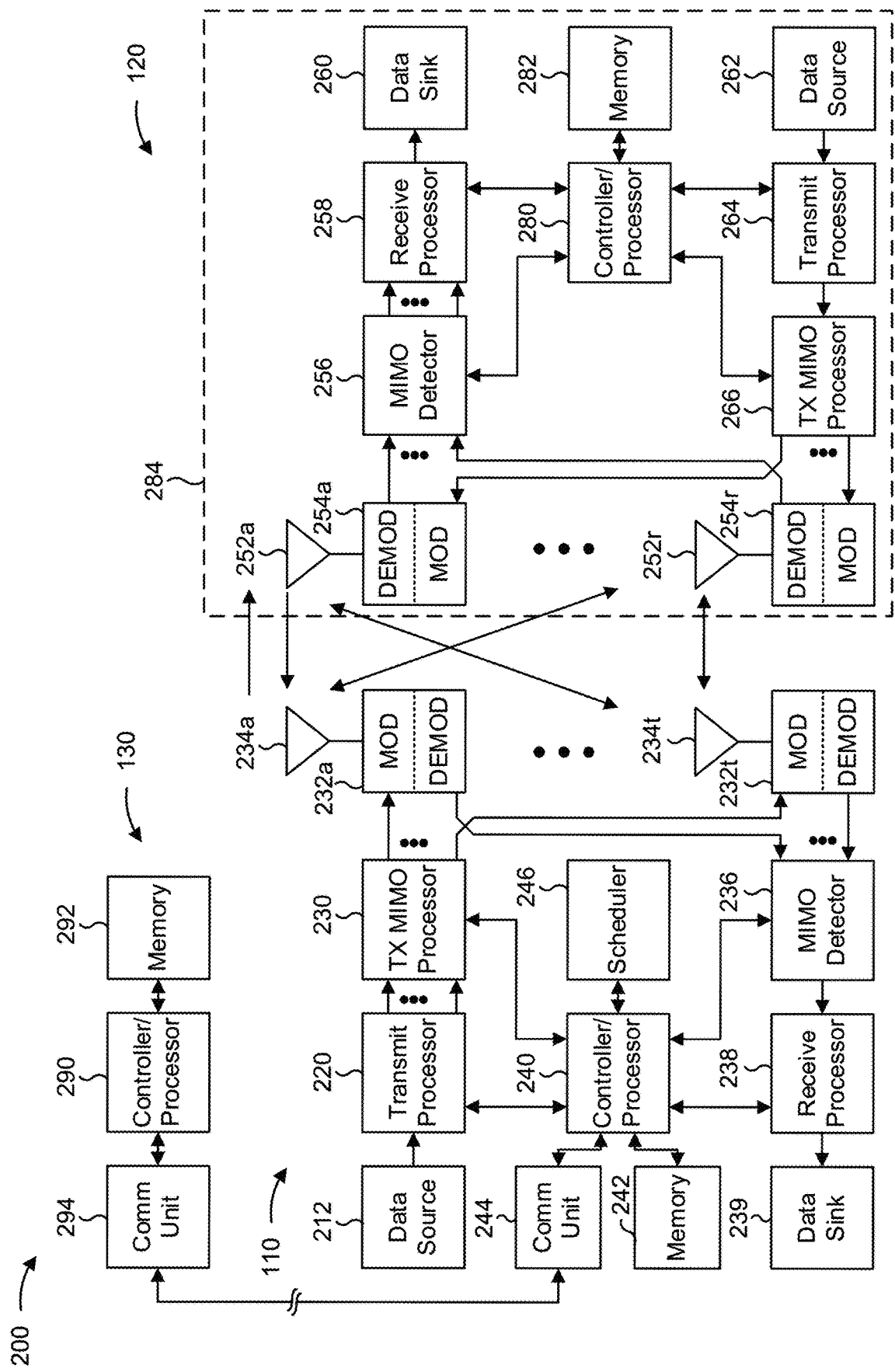
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIG. 4, FIGS. 5A-5B, and/or FIG. 6.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIG. 4, FIGS. 5A-5B, and/or FIG. 6.

Controller/processor 240 of base station 110, controller/processor 280 of UE 120, and/or any other component(s) of FIG. 2 may perform one or more techniques associated with autonomous determination of scheduling parameters for dynamically scheduled uplink transmissions, as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6 and/or other processes as described herein. In some aspects, executing instructions may include running the instructions, converting the instructions, compiling the instructions, and/or interpreting the instructions, among other examples.

In some aspects, UE 120 may include means for receiving a downlink control information (DCI) message that dynamically schedules one or more physical uplink shared channel (PUSCH) transmissions, means for autonomously determining a set of scheduling parameters for the one or more PUSCH transmissions dynamically scheduled by the DCI message, means for transmitting the one or more PUSCH transmissions based at least in part on the set of scheduling parameters, wherein uplink control information (UCI) is multiplexed onto each of the one or more PUSCH transmissions to indicate the set of scheduling parameters autonomously determined for each respective PUSCH transmission, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
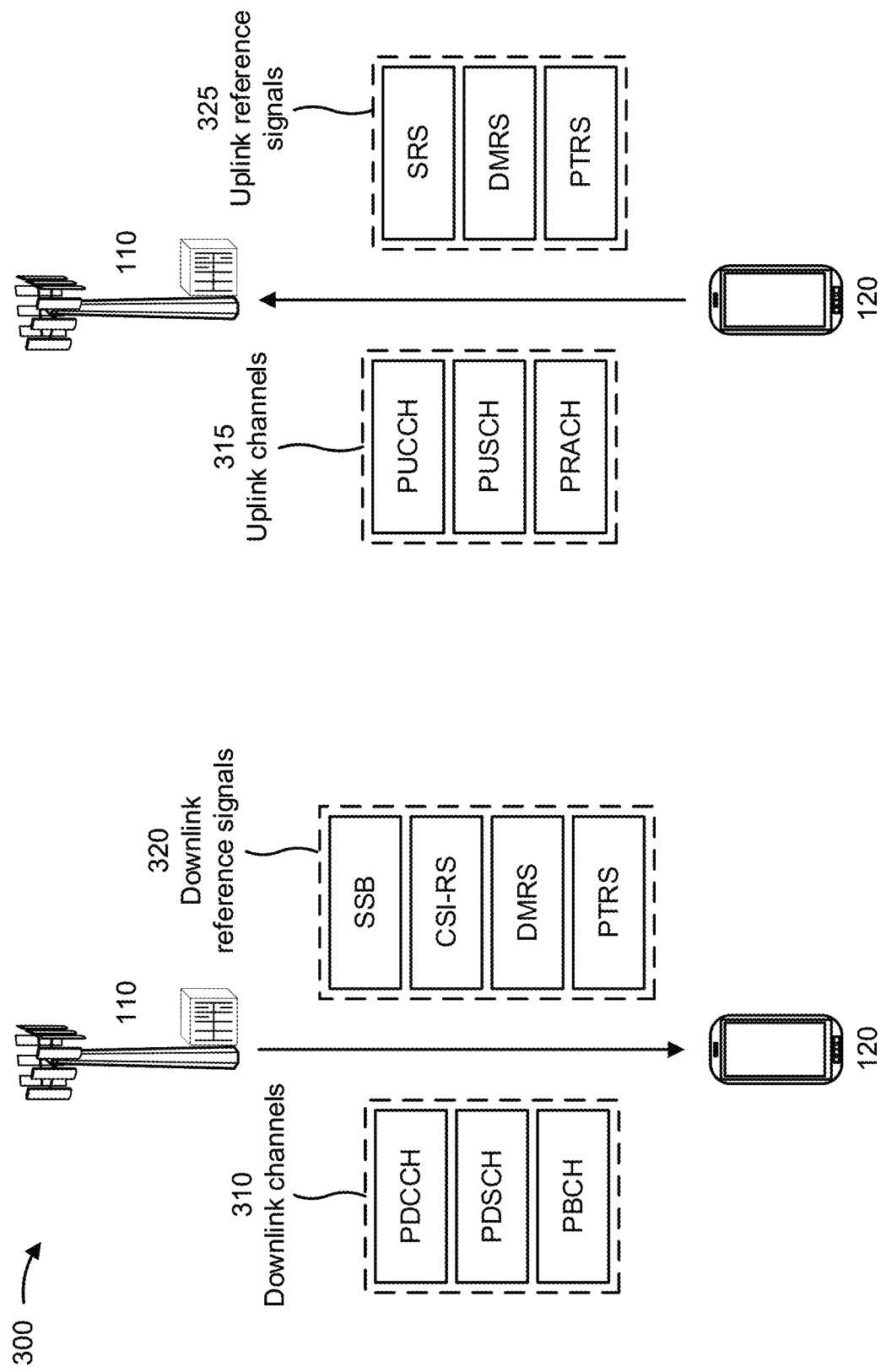
FIG. 3 is a diagram illustrating an example of physical channels and reference signals in a wireless network, in accordance with the present disclosure.

FIG. 3 is a diagram illustrating an example 300 of physical channels and reference signals in a wireless network, in accordance with the present disclosure. As shown in FIG. 3, downlink channels and downlink reference signals may carry information from a base station 110 to a UE 120, and uplink channels and uplink reference signals may carry information from a UE 120 to a base station 110.

As shown by reference number 310, a downlink channel may include a physical downlink control channel (PDCCH) that carries DCI, a physical downlink shared channel (PDSCH) that carries downlink data, or a physical broadcast channel (PBCH) that carries system information, among other examples. In some aspects, PDSCH communications may be scheduled by PDCCH communications. As further shown by reference number 315, an uplink channel may include a physical uplink control channel (PUCCH) that carries UCI, a PUSCH that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH. Furthermore, in some aspects, as described herein, PUSCH communications may be dynamically scheduled by PDCCH communications.

As further shown by reference number 320, a downlink reference signal may include a synchronization signal block (SSB), a channel state information (CSI) reference signal (CSI-RS), a DMRS, or a phase tracking reference signal (PTRS), among other examples. As also shown by reference number 325, an uplink reference signal may include a sounding reference signal (SRS), a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a CQI, a precoding matrix indicator (PMI), a CSI-RS resource indicator (CRI), a layer indicator (LI), a rank indicator (RI), or an RSRP, among other examples. The base station 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown by reference numbers 320 and 325, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown by reference numbers 320 and 325, PTRSs are used for both downlink communications (e.g., on the PDSCH) and uplink communications (e.g., on the PUSCH).

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

As indicated above, FIG. 3 is provided as an example. Other examples may differ from what is described with regard to FIG. 3.

Figure 4:
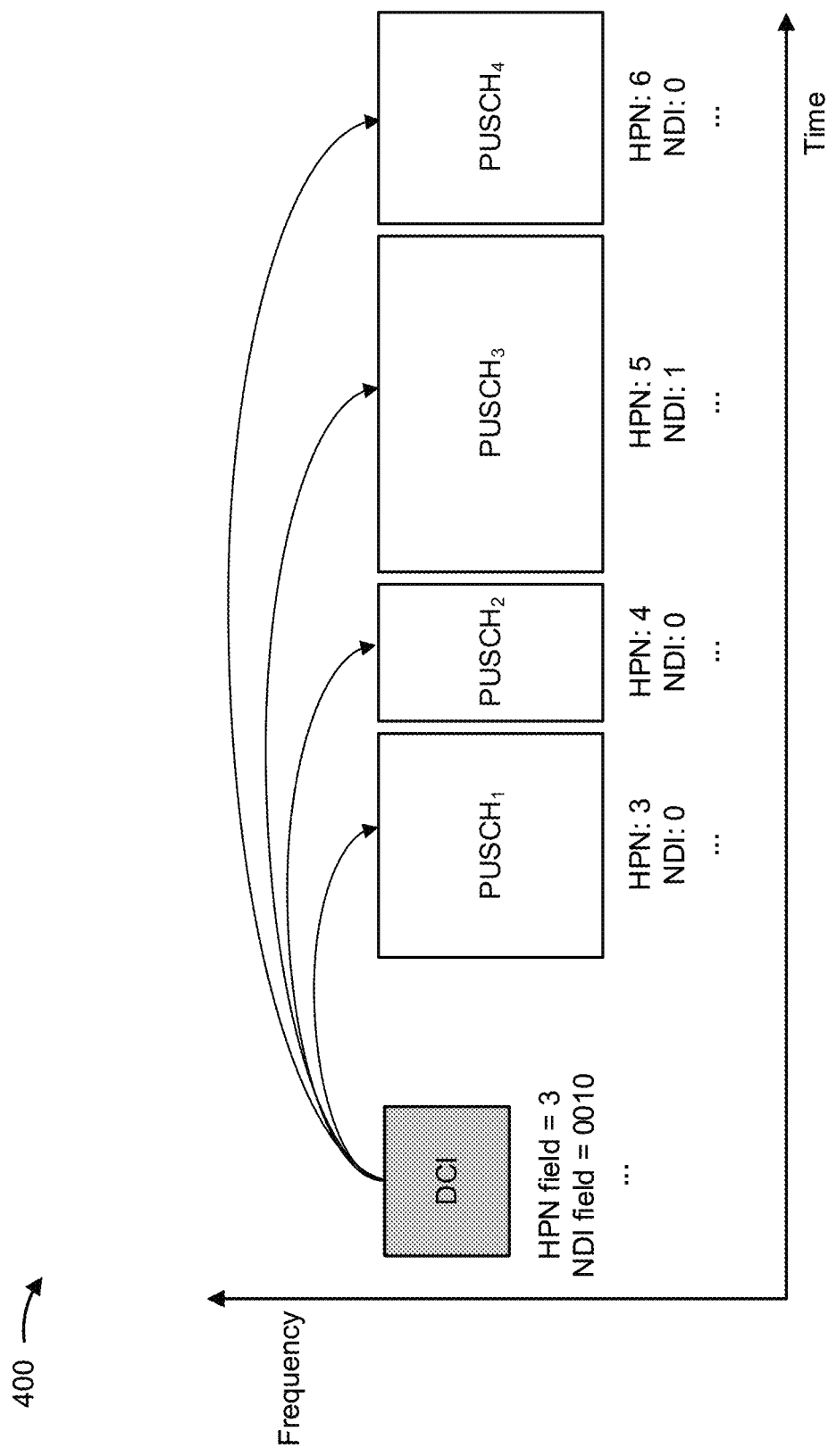
FIG. 4 is a diagram illustrating an example of a single downlink control information message scheduling multiple uplink data transmissions, in accordance with the present disclosure.

FIG. 4 is a diagram illustrating an example 400 of a single downlink control information message scheduling multiple uplink data transmissions, in accordance with the present disclosure. In some aspects, as described above, a PUSCH transmission that carries uplink data may be dynamically scheduled by a downlink communication, such as a DCI message carried on a PDCCH. For example, in some aspects, a DCI message that dynamically schedules a PUSCH transmission may indicate various scheduling parameters for the scheduled PUSCH transmission, such as a resource allocation (e.g., a frequency domain resource allocation (FDRA), a time domain resource allocation (TDRA), and/or the like), an MCS, a hybrid automatic repeat request (HARD) process number, a new data indicator (NDI), a redundancy version (RV), and/or the like. Furthermore, in some aspects, as shown in FIG. 4, a single DCI message may be used to dynamically schedule multiple PUSCH transmissions.

In such cases, the FDRA may be the same for all of the PUSCH transmissions scheduled by the single DCI message (e.g., the DCI message does not individually control a position of the PUSCH transmissions in a frequency domain), but the TDRA may be indicated or determined per PUSCH transmission because the multiple PUSCH transmissions are generally transmitted sequentially at different times. In some aspects, the DCI message scheduling the multiple PUSCH transmissions may include a TDRA field that indicates a particular row in a TDRA table configured via radio resource control (RRC) signaling, where each row in the TDRA table includes up to M start symbol and length values, where M is a maximum number of PUSCH transmissions that can be scheduled in a single DCI message, which may be determined based on the RRC-configured TDRA table. Accordingly, a DCI message scheduling one PUSCH transmission generally indicates a row in the TDRA table that has one start symbol and length. Otherwise, if the row indicated by the DCI message includes more than one start symbol and length, the number of start symbol and length values configured for the indicated row determines the number of PUSCH transmissions that are scheduled by the DCI message, and each start symbol and length value determines the time domain resources that are allocated to one PUSCH transmission.

In some aspects, as described herein, when a DCI message dynamically schedules multiple PUSCH transmissions, the multiple PUSCH transmissions may correspond to different PUSCH transmissions with different transport blocks (TBs), rather than different repetitions of the same PUSCH transmission. Accordingly, the single DCI message may include various fields to determine certain scheduling parameters that are specific to the respective PUSCH transmission, and a bit width of one or more of the fields in the DCI message may be a function of the number of PUSCH transmissions that are scheduled by the single DCI message. For example, because each PUSCH transmission is associated with a different TB, each PUSCH may be associated with a different HARQ process number to enable asynchronous HARQ-ACK feedback. Accordingly, a DCI message scheduling multiple PUSCH transmissions may include a HARQ process number field that indicates a starting HARQ process number for a first PUSCH transmission, and the HARQ process number for subsequent PUSCH transmissions are incremented by one. For example, as shown in FIG. 4, a DCI message scheduling four PUSCH transmissions may indicate a HARQ process number of three (3) for the first PUSCH transmission, such that the second PUSCH transmission is associated with a HARQ process number of four, the third PUSCH transmission is associated with a HARQ process number of five, and the fourth PUSCH transmission is associated with a HARQ process number of six.

Furthermore, in some aspects, the DCI may indicate an NDI and an RV for each PUSCH transmission that is scheduled by the DCI message. For example, the NDI field may be toggled for a given HARQ process number if the corresponding PUSCH transmission is a new transmission or not toggled for the given HARQ process number if the corresponding PUSCH transmission is a retransmission, and the RV field may indicate an amount of redundancy added to the corresponding PUSCH transmission depending on whether the corresponding PUSCH transmission is a new transmission, a first retransmission, a second retransmission, or a third retransmission.

Accordingly, as described above, the number of bits in a DCI message that dynamically schedules one or more PUSCH transmissions may vary depending on whether the DCI message schedules one or multiple PUSCH transmissions. However, a DCI size generally needs to be aligned regardless of whether the DCI message schedules one PUSCH transmission or multiple PUSCH transmission (e.g., to enable using the same DCI format for both cases). Accordingly, in some aspects, zeros may be appended to the DCI format used for dynamic uplink scheduling (e.g., DCI format 0_1) until the payload size is the same for a DCI message scheduling a single PUSCH transmission and a DCI message scheduling multiple PUSCH transmissions. However, while these techniques can be used to schedule one or multiple PUSCH transmissions using a single DCI message, the single DCI message may have a large payload size in cases when M, the maximum number of PUSCH transmissions that can be scheduled in one DCI message, has a large value (e.g., because the NDI and RV fields both include M bits when the DCI message schedules multiple PUSCH transmissions). Furthermore, the DCI message lacks flexibility, because the different PUSCH transmissions scheduled by the DCI are constrained to having consecutive HARQ process numbers based on the starting HARQ process number indicated in the DCI message (e.g., multiple PUSCH transmissions with non-contiguous HARQ process numbers cannot be scheduled in the same DCI message). Furthermore, because the RV field is limited to one bit per PUSCH transmission in the case of scheduling multiple PUSCH transmissions (e.g., to avoid the RV field swelling to 2M bits), a given PUSCH transmission can only be assigned one of two RV values (e.g., zero or two).

Some aspects described herein relate to techniques and apparatuses for autonomous determination of scheduling parameters for dynamically scheduled uplink transmissions, whereby a UE may independently determine the scheduling parameters without reliance on any signaling from a base station. For example, in some aspects, a base station may transmit, and a UE may receive, a single DCI message that dynamically schedules one or more PUSCH transmissions, and the UE may autonomously determine one or more scheduling parameters (e.g., a HARQ process number, an NDI value, an RV value, and/or the like) for each PUSCH transmission scheduled by the DCI message (e.g., without reference to any scheduling parameters indicated in the DCI message and/or in the absence of scheduling parameters indicated in the DCI message). In some aspects, the UE may generate UCI that indicates the autonomously determined scheduling parameters for each PUSCH transmission, and may multiplex the UCI onto each corresponding PUSCH transmission. Accordingly, the base station may decode the UCI to determine the scheduling parameters that were autonomously determined by the UE, and may then use the decoded UCI to decode the uplink data in the corresponding PUSCH transmission. In this way, one or more fields (e.g., an NDI field, an RV field, and/or the like) may be omitted from the DCI message that schedules the PUSCH transmission(s), which reduces the bit size of the DCI message even if the DCI message schedules a large number of PUSCH transmissions. Furthermore, enabling the UE to autonomously determine the HARQ process number, an NDI value, an RV value, and/or the like for each PUSCH transmission without requiring the scheduling parameters to be indicated in the scheduling DCI increases flexibility of the dynamic DCI scheduling. For example, in this way, the DCI message can be used to schedule PUSCH transmissions with non-consecutive HARQ process numbers, any available RV value, and/or the like.

As indicated above, FIG. 4 is provided as an example. Other examples may differ from what is described with regard to FIG. 4.

Figure 5A:
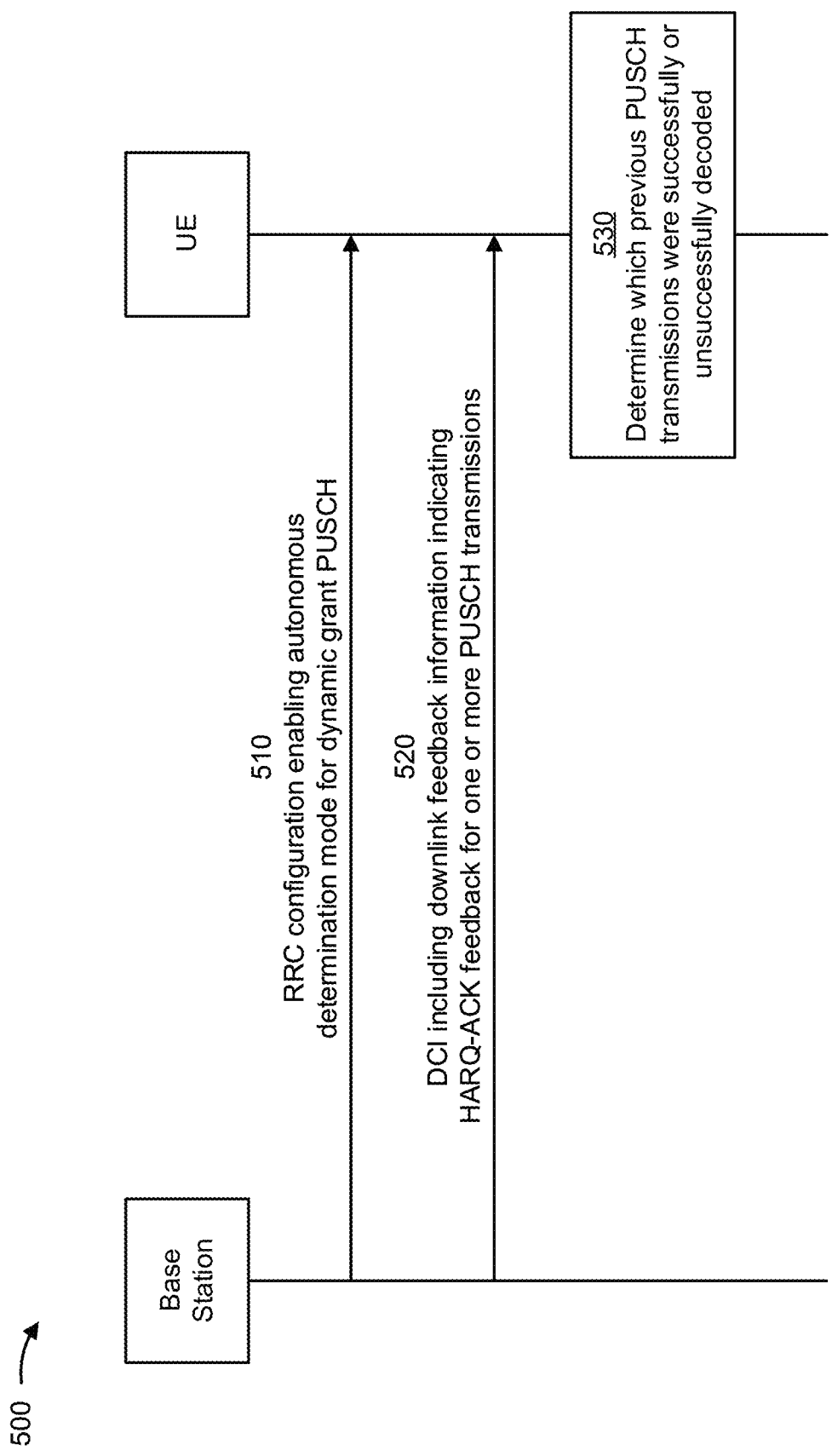
FIGS. 5A-5B are diagrams illustrating an example associated with autonomous determination of scheduling parameters for dynamically scheduled uplink transmissions, in accordance with the present disclosure.
Figure 5B:
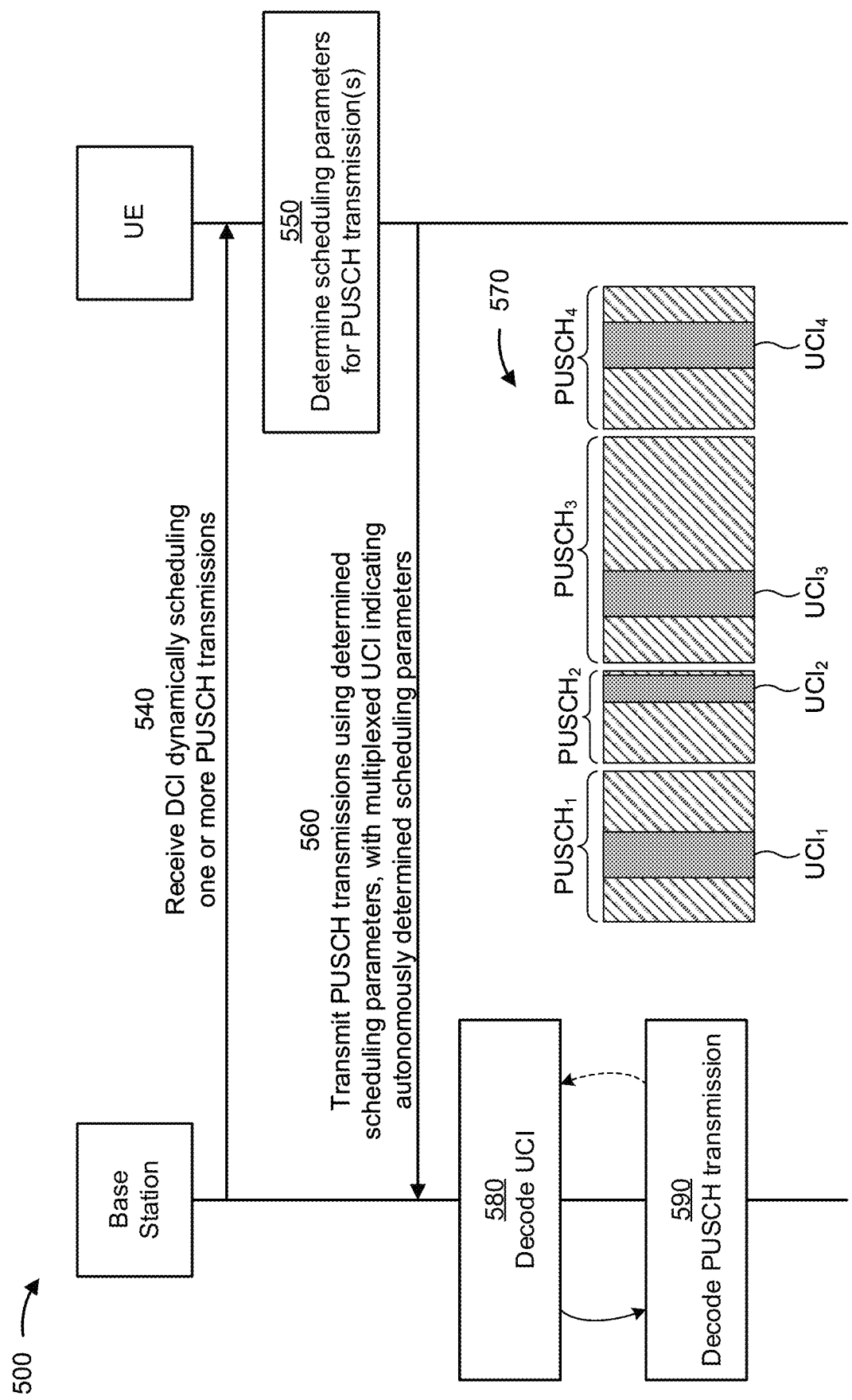

FIGS. 5A-5B are diagrams illustrating an example 500 associated with autonomous determination of scheduling parameters for dynamically scheduled uplink transmissions, in accordance with the present disclosure. As shown in FIGS. 5A-5B, example 500 includes a UE (e.g., UE 120) in communication with a base station (e.g., base station 110) in a wireless network (e.g., wireless network 100).

As shown in FIG. 5A, and by reference number 510, the base station may transmit, and the UE may receive, RRC configuration information that enables an autonomous determination mode for a dynamic grant PUSCH. In some aspects, the RRC configuration information may indicate that the UE is to autonomously determine one or more scheduling parameters for one or more PUSCH transmissions that are dynamically scheduled by a single DCI message (e.g., enabling the UE to independently determine scheduling parameters for a dynamic grant PUSCH without reference to any scheduling parameters indicated in the DCI message and/or in cases where the DCI message does not indicate one or more scheduling parameters). For example, as described herein, the UE may autonomously determine a HARQ process number, an NDI value, an RV value, and/or the like for one or more PUSCH transmissions that are dynamically scheduled by a single DCI message, or the UE may autonomously determine the HARQ process number, NDI value, RV value, and/or the like per PUSCH transmission only if a single DCI message schedules multiple PUSCH transmissions (e.g., in some cases, the HARQ process number, NDI value, RV value, and/or the like may be indicated by the DCI message when only one PUSCH transmission is dynamically scheduled). Furthermore, in some aspects, the RRC configuration information may indicate a TDRA table applicable to dynamically scheduled PUSCH transmissions. For example, as described above, the TDRA table may include various rows that each include one or multiple start symbol and length entries to enable a single DCI message to dynamically schedule one or more PUSCH transmissions, up to a maximum of M, by indicating a particular row in the TDRA table that has the corresponding number of start symbol and length entries.

As further shown in FIG. 5A, and by reference number 520, the base station may transmit, and the UE may receive, a DCI message that includes downlink feedback information (DFI) indicating HARQ-ACK feedback for one or more previous PUSCH transmissions. In some aspects, the base station may configure the DCI message according to a particular format that is used to carry DFI (e.g., DCI format 0_1) to enable the UE to determine whether the base station successfully received and decoded one or more previous PUSCH transmissions. Accordingly, in some aspects, the DCI message may include a DFI flag that may be set to one (1) to indicate that the DCI message includes HARQ-ACK feedback for previous PUSCH transmissions. Furthermore, to indicate that the DFI provided in the DCI message is for dynamically scheduled PUSCH transmissions, a cyclic redundancy code (CRC) of the DCI message may be scrambled with a cell radio network temporary identifier (C-RNTI) or a modulation and coding scheme C-RNTI (MCS-C-RNTI). In some aspects, when the DFI flag is set to one (1), the DCI message may include a bitmap having a series of bits to indicate HARQ-ACK feedback for each HARQ process number that may be associated with the previous PUSCH transmissions. For example, HARQ process numbers may be in a range from 0-15 (e.g., sixteen available HARQ process numbers), whereby the bitmap may have sixteen bits to indicate an ACK or NACK for a previous PUSCH transmission associated with each HARQ process number.

As further shown in FIG. 5A, and by reference number 530, the UE may determine which previous PUSCH transmissions were successfully decoded and which previous PUSCH transmissions were unsuccessfully decoded based at least in part on the DFI provided in the DCI message. In some aspects, the UE may determine a previous PUSCH transmission that corresponds to each HARQ process number, and may determine whether the corresponding previous PUSCH transmission was successfully or unsuccessfully decoded according to the bitmap that indicates an ACK or a NACK for each HARQ process number. In this way, by determining which HARQ process numbers are associated with a NACK in the DFI, the UE may determine which previous PUSCH transmissions need to be retransmitted. Furthermore, by determining which HARQ process numbers are associated with an ACK in the DFI, the UE may determine which HARQ process numbers are available to use for new retransmissions. For example, if the UE determines that the fifth and tenth bits in the bitmap are set to zero (0) to indicate a NACK for the corresponding PUSCH transmission, the UE may determine that the previous PUSCH transmissions associated with HARQ process numbers four (4) and nine (9) were not decoded and need to be retransmitted. In this way, as described herein, the DFI provided in the DCI message may enable the UE to autonomously determine one or more HARQ process numbers for PUSCH transmissions that correspond to retransmissions, and to autonomously determine one or more HARQ process numbers that are available to use for PUSCH transmissions that correspond to new transmissions. However, it will be appreciated that the DFI provided from the base station to the UE is only one example of information that may enable the UE to autonomously determine scheduling parameters for dynamically scheduled PUSCH transmissions, and that other suitable techniques may be used.

As shown in FIG. 5B, and by reference number 540, the base station may transmit, and the UE may receive, a DCI message that dynamically schedules one or more PUSCH transmissions. In some aspects, the DCI message may indicate an FDRA that is applicable to all of the dynamically scheduled PUSCH transmissions, and may further indicate a row in the RRC-configured TDRA table to indicate a number of PUSCH transmissions that are scheduled and time domain resources that are allocated to each PUSCH transmission (e.g., based on a starting symbol and length value in the indicated row of the TDRA table that applies to each respective PUSCH transmission).

Furthermore, in some aspects, the DCI that dynamically schedules the PUSCH transmission(s) may include a four-bit HARQ process number field to indicate one of sixteen (16) possible HARQ process numbers, a one-bit NDI field that may be toggled relative to a previous NDI value associated with the same HARQ process number to indicate that the corresponding PUSCH transmission is a new transmission or not toggled relative to the previous NDI value to indicate that the corresponding PUSCH transmission is a retransmission, and a two-bit RV field to indicate one of four (4) possible RV values. Accordingly, when the DCI message schedules one PUSCH transmission (e.g., when the indicated row of the TDRA table has one start symbol and length entry), the HARQ process number field, the NDI field, and the RV field of the DCI message may indicate the values for the HARQ process number, the NDI, and the RV for the one PUSCH transmission. Alternatively, when the DCI message schedules multiple PUSCH transmission (e.g., when the indicated row of the TDRA table has more than one start symbol and length entry), the UE may ignore the values in the HARQ process number field, the NDI field, and the RV field (if present) and may instead autonomously determine the values for the HARQ process number, NDI, and RV for each PUSCH transmission, as described in further detail herein.

Alternatively, in some aspects, the HARQ process number field, the NDI field, and the RV field may be omitted from the DCI scheduling the PUSCH transmission(s). In this case, the omission of the HARQ process number field, the NDI field, and the RV field from the DCI message may indicate that the UE is to autonomously determine the values of the HARQ process number, the NDI, and the RV for each PUSCH transmission scheduled by the DCI message regardless of whether the DCI message dynamically schedules one PUSCH transmission or multiple PUSCH transmissions.

As further shown in FIG. 5B, and by reference number 550, the UE may determine one or more scheduling parameters for the PUSCH transmission(s) dynamically scheduled by the DCI. For example, in some aspects, the UE may determine an FDRA applicable to the PUSCH transmission(s) that are dynamically scheduled by the DCI according to an FDRA indication provided in the DCI message, may determine a TDRA applicable to each respective PUSCH transmission dynamically scheduled by the DCI according to a TDRA indication provided in the DCI message, and may determine a number of PUSCH transmissions scheduled by the DCI message according to a number of start symbol and length entries in a row of the TDRA table that is indicated by the TDRA indication provided in the DCI message. Furthermore, in some aspects, the UE may determine a HARQ process number, an NDI, and an RV for each respective PUSCH transmission dynamically scheduled by the DCI message.

For example, when the DCI message schedules one PUSCH transmission (e.g., the DCI message indicates a row in the TDRA table that has one start symbol and length entry) and includes a HARQ process number field, an NDI field, and an RV field, the UE may determine the HARQ process number, the NDI value, the RV value, and/or the like for the individual PUSCH transmission from the values indicated in the DCI message. Alternatively, when the DCI message indicates a row in the TDRA table that has multiple start symbol and length entries, the UE may ignore the HARQ process number field, the NDI field, and the RV field indicated in the DCI message and may instead autonomously determine the HARQ process number, the NDI value, the RV value, and/or the like for the PUSCH transmission(s) scheduled by the DCI message. Alternatively, when the HARQ process number field, the NDI field, and the RV field are omitted from the DCI message, the UE may autonomously determine the HARQ process number, the NDI value, the RV value, and/or the like for the PUSCH transmission(s) scheduled by the DCI message regardless of how many PUSCH transmissions are scheduled by the DCI message. For example, as described herein, the UE may autonomously determine the HARQ process number, the NDI value, the RV value, and/or the like for the one or more PUSCH transmissions scheduled by the DCI message using the HARQ-ACK feedback that indicates whether one or more previous PUSCH transmissions were successfully received and decoded by the base station.

For example, as described above, the UE may use the HARQ-ACK feedback provided by the base station to determine one or more previous PUSCH transmissions that the base station failed to successfully receive and/or decode, and the UE may further use the HARQ-ACK feedback to determine one or more previous PUSCH transmissions that the base station successfully received and decoded. Furthermore, each previous PUSCH transmission may be associated with a particular HARQ process number. Accordingly, in some aspects, the UE may use the HARQ-ACK feedback to identify one or more HARQ process numbers that are associated with previous PUSCH transmissions that are to be retransmitted (e.g., HARQ process numbers corresponding to previous PUSCH transmissions that are associated with a NACK) and/or to identify one or more HARQ process numbers that are available to use for new PUSCH transmissions (e.g., HARQ process numbers corresponding to previous PUSCH transmissions that are associated with an ACK).

In some aspects, for a PUSCH transmission that is a retransmission of a previous PUSCH transmission that the base station failed to successfully receive and/or decode (e.g., a retransmission of the same transport block as the previous PUSCH transmission), the UE may autonomously determine that the HARQ process number to be associated with the retransmission is the same as the HARQ process number associated with the previous PUSCH transmission that the base station failed to successfully receive and/or decode. Furthermore, the UE may autonomously determine that the NDI value associated with the retransmission is not toggled (e.g., is the same as) the NDI value associated with the previous PUSCH transmission. Furthermore, the UE may autonomously select an RV value to be associated with the retransmission from a set of RV values that are available to use for retransmissions. For example, the set of RV values may include the values {0, 1, 2, 3}, and the UE may select the RV value to be associated with the retransmission by incrementing the RV value associated with the previous PUSCH transmission. Furthermore, in some aspects, the UE may increment the RV value associated with the previous PUSCH transmission using a modulo operation that is based on a number of RV values in the set of RV values. For example, given the set of four RV values {0, 1, 2, 3}, a modulo 4 operation may result in the RV value associated with the retransmission being incremented to 1 if the RV value associated with the previous PUSCH transmission was 0, incremented to 2 if the RV value associated with the previous PUSCH transmission was 1, incremented to 3 if the RV value associated with the previous PUSCH transmission was 2, or incremented to 0 if the RV value associated with the previous PUSCH transmission was 3. Furthermore, in some aspects, the UE may autonomously determine that a transport block size (TBS) associated with the retransmission is the same as the TBS associated with the previous PUSCH transmission associated with the same HARQ process number.

In some aspects, for a PUSCH transmission that is a new transmission, the UE may autonomously determine the HARQ process number to be associated with the new transmission from a set of HARQ process numbers that are available for new transmissions. For example, based on the HARQ-ACK feedback received from the base station, the UE may identify HARQ process numbers to be associated with retransmissions (if any), and remaining HARQ process numbers may be available for new transmissions. For example, if a set of HARQ process numbers includes sixteen (16) possible values indexed from zero (0) to fifteen (15) and the HARQ-ACK feedback indicates that HARQ process numbers {0, 2, 5, 11} require retransmission, then the remaining HARQ process numbers {1, 3, 4, 6-10, 12-15} are available for new transmissions. Accordingly, in some aspects, the UE may autonomously select the HARQ process number for a new transmission from the set of HARQ process numbers that are available for new transmissions, which generally excludes HARQ process numbers that require retransmission. Furthermore, in some aspects, when the number of HARQ process numbers that are available for new transmissions exceeds a number of scheduled PUSCH transmissions that correspond to new transmissions, the UE may select the smallest HARQ process numbers among the set of HARQ process numbers that are available for new transmissions. For example, if the DCI message schedules eight PUSCH transmissions and the HARQ-ACK feedback indicates that HARQ process numbers {0, 2, 5, 11} require retransmission, the UE may assign HARQ process numbers 0, 2, 5, and 11 to four of the eight PUSCH transmissions that correspond to retransmissions and may assign HARQ process numbers 1, 3, 4, and 6 to the four remaining PUSCH transmissions that correspond to new transmissions. Furthermore, in some aspects, the UE may autonomously determine that the NDI value associated with a PUSCH transmission that corresponds to a new transmission is to be toggled (e.g., changed from zero to one or from one to zero) relative to the NDI value previously associated with the same HARQ process number. Furthermore, the UE may determine that an RV value of zero (0) is to be associated with the new transmission. Furthermore, in some aspects, the UE may determine a TBS associated with the new PUSCH transmission according to scheduling information provided in the scheduling DCI (e.g., an FDRA applicable to all of the scheduled PUSCH transmissions, a TDRA and/or MCS associated with the new PUSCH transmission, and/or the like).

As further shown in FIG. 5B, and by reference number 560, the UE may transmit the one or more PUSCH transmissions scheduled by the DCI message using the determined scheduling parameters for each respective PUSCH transmission. For example, each of the PUSCH transmissions may be transmitted using an FDRA indicated in the DCI message scheduling the PUSCH transmission(s), and each individual PUSCH transmission may be transmitted using a TDRA that is indicated in the DCI message per PUSCH transmission (e.g., according to a row in a TDRA table). Furthermore, the UE may transmit each PUSCH transmission using a HARQ process number, an NDI value, an RV value, a TBS, and/or the like that is determined per PUSCH transmission. For example, as described above, the HARQ process number, NDI value, and RV value may be determined from the DCI message in cases where the DCI message schedules one PUSCH transmission and the DCI message includes HARQ process number, NDI, and RV fields. Alternatively, the UE may autonomously determine the HARQ process number, NDI value, and RV value in cases where the DCI message schedules multiple PUSCH transmissions and/or when the HARQ process number, NDI, and RV fields are omitted from the DCI message. In such cases, the UE may further generate UCI to be associated with each respective PUSCH transmission, where the UCI indicates the autonomously determined HARQ process number, NDI value, and RV value. For example, in FIG. 5B, reference number 570 illustrates an example of four PUSCH transmissions, each of which include UCI multiplexed onto the respective PUSCH transmission to indicate the scheduling parameter(s) autonomously determined by the UE. Furthermore, in the case of a PUSCH transmission that is a retransmission of a previous PUSCH transmission, the PUSCH transmission may be transmitted using the same TBS as the previous PUSCH transmission. Otherwise, in the case of a PUSCH transmission that is a new transmission of a new transport block, the PUSCH transmission may be transmitted with a TBS that is determined from scheduling information (e.g., FDRA, TDRA, MCS, and/or the like) provided in the DCI message.

In some aspects, in cases where the DCI message schedules multiple PUSCH transmissions, the UE may further determine an ordering for transmitting the respective PUSCH transmissions based at least in part on whether the multiple PUSCH transmissions correspond to new transmissions or to retransmissions. In some aspects, the UE may order the multiple PUSCH transmissions such that new transmissions are ordered before (e.g., transmitted earlier in time) relative to all retransmissions. For example, if the DCI message schedules four PUSCH transmissions (e.g., as shown by reference number 570), two of which correspond to new transmissions and two of which correspond to retransmissions, then $PUSCH_1$ and $PUSCH_2$ may be used for the new transmissions and $PUSCH_3$ and $PUSCH_4$ may be used for the retransmissions. Alternatively, the UE may order the multiple PUSCH transmissions such that retransmissions are ordered before (e.g., transmitted earlier in time) relative to all new transmissions. In this case, $PUSCH_1$ and $PUSCH_2$ may be used for the retransmissions and $PUSCH_3$ and $PUSCH_4$ may be used for the new transmissions. Alternatively, the UE may order the multiple PUSCH transmissions such that retransmissions are mapped to PUSCH allocations with larger time domain allocations (e.g., longer lengths or durations in terms of symbols, slots, and/or the like) relative to new transmissions. Furthermore, among the HARQ process numbers that correspond to retransmissions, the retransmissions with a larger TBS may be mapped to PUSCH allocations larger time domain allocations. In this case, because $PUSCH_3$ has a largest time domain allocation, $PUSCH_3$ may be mapped to a first retransmission that has a largest TBS, a second retransmission may be mapped to either $PUSCH_1$ or $PUSCH_4$ (which have an equal time domain allocation that is larger than $PUSCH_2$), and the two new transmissions may be mapped to $PUSCH_2$ and either $PUSCH_1$ or $PUSCH_4$.

As further shown in FIG. 5B, and by reference number 580, the base station may decode the UCI that is multiplexed onto each PUSCH transmission, if present, to determine the scheduling parameters that were autonomously determined by the UE for the respective PUSCH transmission. Alternatively, in the case of a single DCI scheduling one PUSCH transmission and indicating the HARQ process number, NDI value, and RV value for the PUSCH transmission, UCI is not multiplexed onto the PUSCH transmission. As further shown in FIG. 5B, and by reference number 590, the base station may decode each PUSCH transmission. In cases where the PUSCH transmission(s) include multiplexed UCI to indicate the scheduling parameters autonomously determined by the UE, the base station may decode the PUSCH transmission(s) according to the scheduling parameters indicated in the UCI. Otherwise, in the case of a single DCI scheduling one PUSCH transmission and indicating the HARQ process number, NDI value, and RV value for the PUSCH transmission, the base station may decode the PUSCH transmission according to the HARQ process number, NDI value, and RV value indicated in the DCI. Furthermore, in cases where the DCI schedules multiple PUSCH transmissions, the base station may repeat the process of decoding the UCI that indicates the autonomously determined scheduling parameters prior to decoding the uplink data in the corresponding PUSCH transmission for each of the multiple PUSCH transmissions.

As indicated above, FIGS. 5A-5B are provided as an example. Other examples may differ from what is described with regard to FIGS. 5A-5B.

Figure 6:
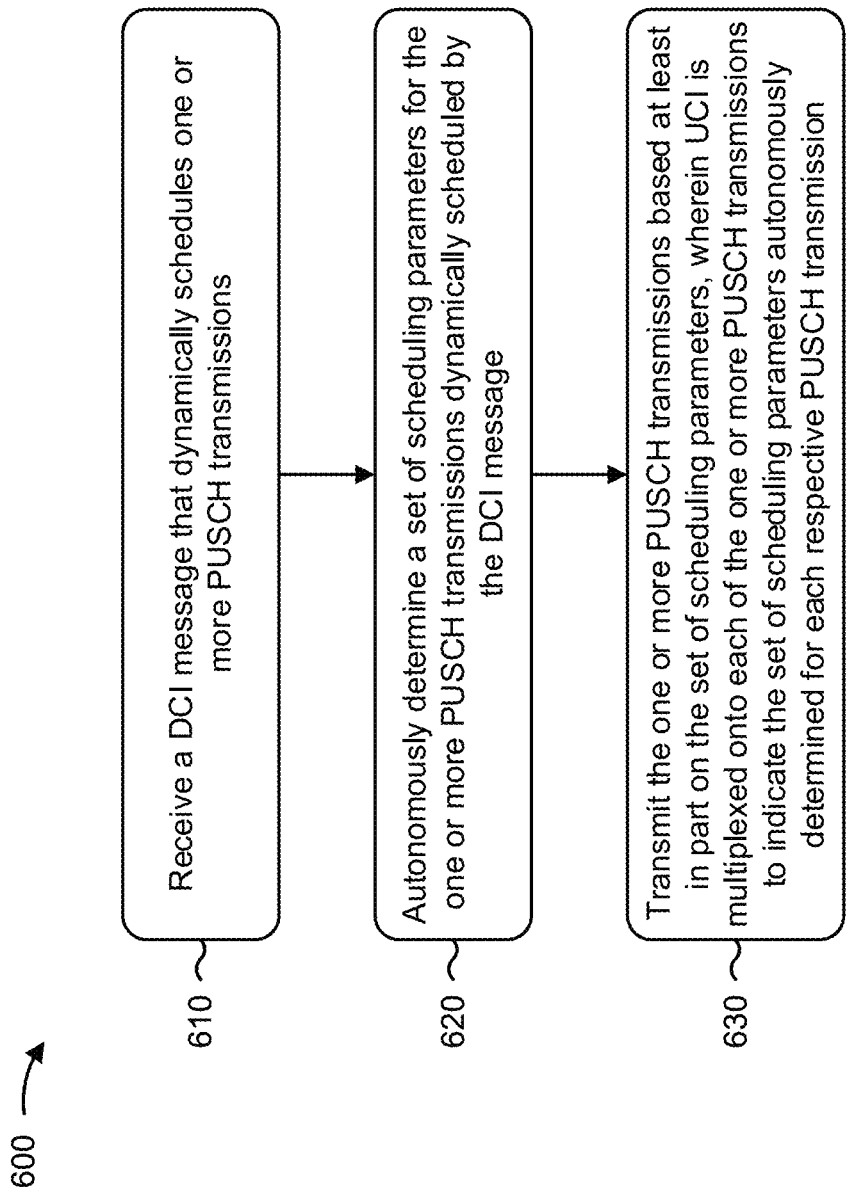
FIG. 6 is a diagram illustrating an example process associated with autonomous determination of scheduling parameters for dynamically scheduled uplink transmissions, in accordance with the present disclosure.

FIG. 6 is a diagram illustrating an example process 600 performed, for example, by a UE, in accordance with the present disclosure. Example process 600 is an example where the UE (e.g., UE 120 and/or the like) performs operations associated with autonomous determination of scheduling parameters for dynamically scheduled uplink transmissions.

As shown in FIG. 6, in some aspects, process 600 may include receiving a DCI message that dynamically schedules one or more PUSCH transmissions (block 610). For example, the UE may receive (e.g., using antenna 252, DEMOD 254, MIMO detector 256, receive processor 258, controller/processor 280, memory 282, and/or the like) may receive a DCI message that dynamically schedules one or more PUSCH transmissions, as described above.

As further shown in FIG. 6, in some aspects, process 600 may include autonomously determining a set of scheduling parameters for the one or more PUSCH transmissions dynamically scheduled by the DCI message (block 620). For example, the UE may autonomously determine (e.g., using controller/processor 280, memory 282, and/or the like) a set of scheduling parameters for the one or more PUSCH transmissions dynamically scheduled by the DCI message, as described above.

As further shown in FIG. 6, in some aspects, process 600 may include transmitting the one or more PUSCH transmissions based at least in part on the set of scheduling parameters, wherein UCI is multiplexed onto each of the one or more PUSCH transmissions to indicate the set of scheduling parameters autonomously determined for each respective PUSCH transmission (block 630). For example, the UE may transmit (e.g., using controller/processor 280, transmit processor 264, TX MIMO processor 266, MOD 254, antenna 252, memory 282, and/or the like) the one or more PUSCH transmissions based at least in part on the set of scheduling parameters, as described above. In some aspects, UCI is multiplexed onto each of the one or more PUSCH transmissions to indicate the set of scheduling parameters autonomously determined for each respective PUSCH transmission.

Process 600 may include additional aspects, such as any single aspect or any combination of aspects described below and/or in connection with one or more other processes described elsewhere herein.

In a first aspect, the set of scheduling parameters include at least one of a HARQ process number, an RV, or an NDI for each respective PUSCH transmission.

In a second aspect, alone or in combination with the first aspect, the set of scheduling parameters is autonomously determined based at least in part on the one or more PUSCH transmissions scheduled by the DCI message including multiple PUSCH transmissions.

In a third aspect, alone or in combination with one or more of the first and second aspects, process 600 includes receiving, prior to the DCI message that dynamically schedules the one or more PUSCH transmissions, HARQ feedback for one or more previous PUSCH transmissions, wherein the set of scheduling parameters is autonomously determined based at least in part on the HARQ feedback.

In a fourth aspect, alone or in combination with one or more of the first through third aspects, autonomously determining the set of scheduling parameters for the one or more PUSCH transmissions includes determining that at least one of the one or more PUSCH transmissions scheduled by the DCI message corresponds to a retransmission of a previous PUSCH transmission based at least in part on the HARQ feedback.

In a fifth aspect, alone or in combination with one or more of the first through fourth aspects, the set of scheduling parameters autonomously determined for the retransmission includes a HARQ process number associated with the previous PUSCH transmission, an NDI that is not toggled relative to an NDI value associated with the previous PUSCH transmission, and an RV that is selected from a set of RV values available for retransmissions.

In a sixth aspect, alone or in combination with one or more of the first through fifth aspects, the RV is selected by incrementing an RV value associated with the previous PUSCH transmission according to a modulo operation that is based at least in part on a number of RV values in the set of RV values.

In a seventh aspect, alone or in combination with one or more of the first through sixth aspects, the set of scheduling parameters autonomously determined for the retransmission includes a TBS associated with the previous PUSCH transmission.

In an eighth aspect, alone or in combination with one or more of the first through seventh aspects, autonomously determining the set of scheduling parameters for the one or more PUSCH transmissions includes determining that at least one of the one or more PUSCH transmissions scheduled by the DCI message corresponds to a new transmission based at least in part on the HARQ feedback.

In a ninth aspect, alone or in combination with one or more of the first through eighth aspects, the set of scheduling parameters autonomously determined for the new transmission includes a HARQ process number selected from a set of HARQ process numbers available for new transmissions, an NDI that is toggled relative to an NDI value for a previous PUSCH transmission associated with the selected HARQ process number, and a default RV associated with new transmissions.

In a tenth aspect, alone or in combination with one or more of the first through ninth aspects, the HARQ process number for the new transmission corresponds to a smallest HARQ process number value in the set of HARQ process numbers available for new transmissions.

In an eleventh aspect, alone or in combination with one or more of the first through tenth aspects, process 600 includes determining a TBS for the new transmission based at least in part on information in the DCI message scheduling the at least one PUSCH transmission that corresponds to the new transmission.

In a twelfth aspect, alone or in combination with one or more of the first through eleventh aspects, the one or more PUSCH transmissions are transmitted further based at least in part on one or more of an FDRA or a TDRA indicated in the DCI message dynamically scheduling the one or more PUSCH transmissions.

In a thirteenth aspect, alone or in combination with one or more of the first through twelfth aspects, process 600 includes ignoring one or more fields in the DCI message that indicate one or more values for the set of scheduling parameters based at least in part on the one or more PUSCH transmissions scheduled by the DCI message including multiple PUSCH transmissions.

In a fourteenth aspect, alone or in combination with one or more of the first through thirteenth aspects, the DCI message that dynamically schedules the one or more PUSCH transmissions does not indicate values for the set of scheduling parameters that are autonomously determined.

In a fifteenth aspect, alone or in combination with one or more of the first through fourteenth aspects, process 600 includes determining that the one or more PUSCH transmissions scheduled by the DCI message includes one or more new transmissions and one or more retransmissions, and determining a mapping between the one or more new transmissions, the one or more retransmissions, and resources allocated to the one or more PUSCH transmissions.

In a sixteenth aspect, alone or in combination with one or more of the first through fifteenth aspects, the mapping associates the one or more new transmissions with a subset of the resources allocated to the one or more PUSCH transmissions that are earlier in time relative to the one or more retransmissions.

In a seventeenth aspect, alone or in combination with one or more of the first through sixteenth aspects, the mapping associates the one or more retransmissions with a subset of the resources allocated to the one or more PUSCH transmissions that are earlier in time relative to the one or more new transmissions.

In an eighteenth aspect, alone or in combination with one or more of the first through seventeenth aspects, the mapping associates the one or more retransmissions with a subset of the resources allocated to the one or more PUSCH transmissions that are larger in a time domain relative to the one or more new transmissions.

In a nineteenth aspect, alone or in combination with one or more of the first through eighteenth aspects, the one or more retransmissions that are associated with the subset of the resources allocated to the one or more PUSCH transmissions that are larger in the time domain include a subset of the one or more retransmissions that have a largest TBS.

In a twentieth aspect, alone or in combination with one or more of the first through nineteenth aspects, process 600 includes receiving RRC configuration information enabling a dynamic uplink grant autonomous determination mode, wherein the set of scheduling parameters for the one or more PUSCH transmissions is autonomously determined based at least in part on the RRC configuration information.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The following provides an overview of some Aspects of the present disclosure:

Aspect 1: A method of wireless communication performed by a UE, comprising: receiving a DCI message that dynamically schedules one or more PUSCH transmissions; autonomously determining a set of scheduling parameters for the one or more PUSCH transmissions dynamically scheduled by the DCI message; and transmitting the one or more PUSCH transmissions based at least in part on the set of scheduling parameters, wherein UCI is multiplexed onto each of the one or more PUSCH transmissions to indicate the set of scheduling parameters autonomously determined for each respective PUSCH transmission.

Aspect 2: The method of Aspect 1, wherein the set of scheduling parameters include at least one of a HARQ process number, an RV, or an NDI for each respective PUSCH transmission.

Aspect 3: The method of any of Aspects 1-2, wherein the set of scheduling parameters is autonomously determined based at least in part on the one or more PUSCH transmissions scheduled by the DCI message including multiple PUSCH transmissions.

Aspect 4: The method of any of Aspects 1-3, further comprising: receiving, prior to the DCI message that dynamically schedules the one or more PUSCH transmissions, HARQ feedback for one or more previous PUSCH transmissions, wherein the set of scheduling parameters is autonomously determined based at least in part on the HARQ feedback.

Aspect 5: The method of Aspect 4, wherein autonomously determining the set of scheduling parameters for the one or more PUSCH transmissions includes: determining that at least one of the one or more PUSCH transmissions scheduled by the DCI message corresponds to a retransmission of a previous PUSCH transmission based at least in part on the HARQ feedback; and autonomously determining the set of scheduling parameters for the retransmission based at least in part on a set of scheduling parameters associated with the previous PUSCH transmission.

Aspect 6: The method of Aspect 5, wherein the set of scheduling parameters autonomously determined for the retransmission includes a HARQ process number associated with the previous PUSCH transmission, an NDI that is not toggled relative to an NDI value associated with the previous PUSCH transmission, and an RV that is selected from a set of RV values available for retransmissions.

Aspect 7: The method of Aspect 6, wherein the RV is selected by incrementing an RV value associated with the previous PUSCH transmission according to a modulo operation that is based at least in part on a number of RV values in the set of RV values.

Aspect 8: The method of any of Aspects 5-7, wherein the set of scheduling parameters autonomously determined for the retransmission includes a TBS associated with the previous PUSCH transmission.

Aspect 9: The method of any of Aspects 5-8, wherein autonomously determining the set of scheduling parameters for the one or more PUSCH transmissions includes: determining that at least one of the one or more PUSCH transmissions scheduled by the DCI message corresponds to a new transmission based at least in part on the HARQ feedback; and autonomously determining the set of scheduling parameters for the new transmission based at least in part on a set of scheduling parameters associated with a previous PUSCH transmission that has been successfully decoded.

Aspect 10: The method of Aspect 9, wherein the set of scheduling parameters autonomously determined for the new transmission includes a HARQ process number selected from a set of HARQ process numbers available for new transmissions, an NDI that is toggled relative to an NDI value for a previous PUSCH transmission associated with the selected HARQ process number, and a default RV associated with new transmissions.

Aspect 11: The method of Aspect 10, wherein the HARQ process number for the new transmission corresponds to a smallest HARQ process number value in the set of HARQ process numbers available for new transmissions.

Aspect 12: The method of any of Aspects 9-11, further comprising: determining a TBS for the new transmission based at least in part on information in the DCI message scheduling the at least one PUSCH transmission that corresponds to the new transmission.

Aspect 13: The method of any of Aspects 1-12, wherein the one or more PUSCH transmissions are transmitted further based at least in part on one or more of an FDRA or a TDRA indicated in the DCI message dynamically scheduling the one or more PUSCH transmissions.

Aspect 14: The method of any of Aspects 1-13, further comprising: ignoring one or more fields in the DCI message that indicate one or more values for the set of scheduling parameters based at least in part on the one or more PUSCH transmissions scheduled by the DCI message including multiple PUSCH transmissions.

Aspect 15: The method of any of Aspects 1-14, wherein the DCI message that dynamically schedules the one or more PUSCH transmissions does not indicate values for the set of scheduling parameters that are autonomously determined.

Aspect 16: The method of any of Aspects 1-15, further comprising: determining that the one or more PUSCH transmissions scheduled by the DCI message includes one or more new transmissions and one or more retransmissions; and determining a mapping between the one or more new transmissions, the one or more retransmissions, and resources allocated to the one or more PUSCH transmissions.

Aspect 17: The method of Aspect 16, wherein the mapping associates the one or more new transmissions with a subset of the resources allocated to the one or more PUSCH transmissions that are earlier in time relative to the one or more retransmissions.

Aspect 18: The method of any of Aspects 16-17, wherein the mapping associates the one or more retransmissions with a subset of the resources allocated to the one or more PUSCH transmissions that are earlier in time relative to the one or more new transmissions.

Aspect 19: The method of any of Aspects 16-18, wherein the mapping associates the one or more retransmissions with a subset of the resources allocated to the one or more PUSCH transmissions that are larger in a time domain relative to the one or more new transmissions.

Aspect 20: The method of Aspect 19, wherein the one or more retransmissions that are associated with the subset of the resources allocated to the one or more PUSCH transmissions that are larger in the time domain include a subset of the one or more retransmissions that have a largest TBS.

Aspect 21: The method of any of Aspects 1-20, further comprising: receiving RRC configuration information enabling a dynamic uplink grant autonomous determination mode, wherein the set of scheduling parameters for the one or more PUSCH transmissions is autonomously determined based at least in part on the RRC configuration information.

Aspect 22: An apparatus for wireless communication at a device, comprising a processor; memory coupled with the processor; and instructions stored in the memory and executable by the processor to cause the apparatus to perform the method of any of Aspects 1-21.

Aspect 23: A device for wireless communication, comprising a memory and one or more processors coupled to the memory, the memory and the one or more processors configured to perform the method of any of Aspects 1-21.

Aspect 24: An apparatus for wireless communication, comprising at least one means for performing the method of any of Aspects 1-21.

Aspect 25: A non-transitory computer-readable medium storing code for wireless communication, the code comprising instructions executable by a processor to perform the method of any of Aspects 1-21.

Aspect 26: A non-transitory computer-readable medium storing a set of instructions for wireless communication, the set of instructions comprising one or more instructions that, when executed by one or more processors of a device, cause the device to perform the method of any of Aspects 1-21.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
   receive hybrid automatic repeat request (HARQ) feedback for one or more previous physical uplink shared channel (PUSCH) transmissions, wherein the one or more previous PUSCH transmissions are associated with a set of previous scheduling parameters;
   receive a downlink control information (DCI) message that dynamically schedules one or more dynamic grant PUSCH transmissions;
   autonomously determine a set of scheduling parameters for the one or more dynamic grant PUSCH transmissions dynamically scheduled by the DCI message, wherein the set of scheduling parameters is not determined based on the DCI message, and wherein the set of scheduling parameters is autonomously determined based at least in part on the HARQ feedback and the set of previous scheduling parameters; and
   transmit the one or more dynamic grant PUSCH transmissions based at least in part on the set of scheduling parameters, wherein uplink control information (UCI) is multiplexed onto each of the one or more dynamic grant PUSCH transmissions to indicate the set of scheduling parameters autonomously determined for each respective dynamic grant PUSCH transmission of the one or more dynamic grant PUSCH transmissions,
   wherein the one or more processors, to autonomously determine the set of scheduling parameters for the one or more dynamic grant PUSCH transmissions, are configured to:
   determine that at least one of the one or more dynamic grant PUSCH transmissions scheduled by the DCI message corresponds to a retransmission of a previous PUSCH transmission based at least in part on the HARQ feedback; and
   autonomously determine the set of scheduling parameters for the retransmission based at least in part on a set of scheduling parameters of the set of previous scheduling parameters associated with the previous PUSCH transmission.

2. The UE of claim 1, wherein the set of scheduling parameters include at least one of a HARQ process number, a redundancy version (RV), or a new data indicator (ND1) for each respective dynamic grant PUSCH transmission of the one or more dynamic grant PUSCH transmissions.

3. The UE of claim 1, wherein the set of scheduling parameters is autonomously determined based at least in part on the one or more dynamic grant PUSCH transmissions scheduled by the DCI message including multiple dynamic grant PUSCH transmissions.

4. The UE of claim 1, wherein the set of scheduling parameters autonomously determined for the retransmission includes a HARQ process number associated with the previous PUSCH transmission, a new data indicator (NDI) that is not toggled relative to an NDI value associated with the previous PUSCH transmission, and a redundancy version (RV) that is selected from a set of RV values available for retransmissions.

5. The UE of claim 4, wherein the RV is selected by incrementing an RV value associated with the previous PUSCH transmission according to a modulo operation that is based at least in part on a number of RV values in the set of RV values.

6. The UE of claim 1, wherein the set of scheduling parameters autonomously determined for the retransmission includes a transport block size associated with the previous PUSCH transmission.

7. The UE of claim 1, wherein the one or more processors, to autonomously determine the set of scheduling parameters for the one or more dynamic grant PUSCH transmissions, are configured to:
   determine that at least one of the one or more dynamic grant PUSCH transmissions scheduled by the DCI message corresponds to a new transmission based at least in part on the HARQ feedback; and
   autonomously determine the set of scheduling parameters for the new transmission based at least in part on a set of scheduling parameters associated with a previous PUSCH transmission that has been successfully decoded.

8. The UE of claim 7, wherein the set of scheduling parameters autonomously determined for the new transmission includes a HARQ process number selected from a set of HARQ process numbers available for new transmissions, a new data indicator (NDI) that is toggled relative to an NDI value for a previous PUSCH transmission associated with the selected HARQ process number, and a default redundancy version (RV) associated with new transmissions.

9. The UE of claim 8, wherein the HARQ process number for the new transmission corresponds to a smallest HARQ process number value in the set of HARQ process numbers available for new transmissions.

10. The UE of claim 7, wherein the one or more processors are further configured to:
    determine a transport block size for the new transmission based at least in part on information in the DCI message scheduling the at least one PUSCH transmission that corresponds to the new transmission.

11. The UE of claim 1, wherein the one or more dynamic grant PUSCH transmissions are transmitted further based at least in part on one or more of a frequency domain resource allocation or a time domain resource allocation indicated in the DCI message dynamically scheduling the one or more dynamic grant PUSCH transmissions.

12. The UE of claim 1, wherein the one or more processors are further configured to:
    ignore one or more fields in the DCI message that indicate one or more values for the set of scheduling parameters based at least in part on the one or more dynamic grant PUSCH transmissions scheduled by the DCI message including multiple dynamic grant PUSCH transmissions.

13. The UE of claim 1, wherein the DCI message that dynamically schedules the one or more dynamic grant PUSCH transmissions does not indicate values for the set of scheduling parameters that are autonomously determined.

14. The UE of claim 1, wherein the one or more processors are further configured to:
    determine that the one or more dynamic grant PUSCH transmissions dynamically scheduled by the DCI message includes one or more new transmissions and one or more retransmissions; and
    determine a mapping between the one or more new transmissions, the one or more retransmissions, and resources allocated to the one or more dynamic grant PUSCH transmissions.

15. The UE of claim 14, wherein the mapping associates the one or more new transmissions with a subset of the resources allocated to the one or more dynamic grant PUSCH transmissions that are earlier in time relative to the one or more retransmissions.

16. The UE of claim 14, wherein the mapping associates the one or more retransmissions with a subset of the resources allocated to the one or more dynamic giant PUSCH transmissions that are earlier in time relative to the one or more new transmissions.

17. The UE of claim 14, wherein the mapping associates the one or more retransmissions with a subset of the resources allocated to the one or more dynamic grant PUSCH transmissions that are larger in a time domain relative to the one or more new transmissions.

18. The UE of claim 17, wherein the one or more retransmissions that are associated with the subset of the resources allocated to the one or more dynamic grant PUSCH transmissions that are larger in the time domain include a subset of the one or more retransmissions that have a largest transport block size.

19. The UE of claim 1, wherein the one or more processors are further configured to:
    receive radio resource control (RRC) configuration information enabling a dynamic uplink grant autonomous determination mode, wherein the set of scheduling parameters for the one or more dynamic grant PUSCH transmissions is autonomously determined based at least in part on the RRC configuration information.

20. The UE of claim 1, wherein the HARQ feedback comprises a bitmap indicating the HARQ feedback for each of the one or more dynamic grant PUSCH transmissions.

21. A method of wireless communication performed by a user equipment (UE), comprising:
    receiving hybrid automatic repeat request (HARQ) feedback for one or more previous physical uplink shared channel (PUSCH) transmissions, wherein the one or more previous PUSCH transmissions are associated with a set of previous scheduling parameters;
    receiving a downlink control information (DCI) message that dynamically schedules one or more dynamic grant PUSCH transmissions;
    autonomously determining a set of scheduling parameters for the one or more dynamic grant PUSCH transmissions dynamically scheduled by the DCI message, wherein the set of scheduling parameters is not determined based on the DCI message, and wherein the set of scheduling parameters is autonomously determined based at least in part on the HARQ feedback and the set of previous scheduling parameters; and
    transmitting the one or more dynamic grant PUSCH transmissions based at least in part on the set of scheduling parameters, wherein uplink control information (UCI) is multiplexed onto each of the one or more dynamic grant PUSCH transmissions to indicate the set of scheduling parameters autonomously determined for each respective dynamic grant PUSCH transmission of the one or more dynamic grant PUSCH transmissions,
    wherein said autonomously determining the set of scheduling parameters for the one or more dynamic grant PUSCH transmissions comprising:
    determining that at least one of the one or more dynamic grant PUSCH transmissions scheduled by the DCI message corresponds to a retransmission of a previous PUSCH transmission based at least in part on the HARQ feedback; and
    autonomously determining the set of scheduling parameters for the retransmission based at least in part on a set of scheduling parameters of the set of previous scheduling parameters associated with the previous PUSCH transmission.

22. The method of claim 21, wherein the set of scheduling parameters include at least one of a hybrid automatic repeat request (HARQ) process number, a redundancy version (RV), or a new data indicator (NDI) for each respective dynamic grant PUSCH transmission of the one or more dynamic grant PUSCH transmissions.

23. The method of claim 21, wherein the set of scheduling parameters is autonomously determined based at least in part on the one or more dynamic grant PUSCH transmissions scheduled by the DCI message including multiple dynamic grant PUSCH transmissions.

24. The method of claim 21, wherein the one or more dynamic grant PUSCH transmissions are transmitted further based at least in part on one or more of a frequency domain resource allocation or a time domain resource allocation indicated in the DCI message dynamically scheduling the one or more dynamic grant PUSCH transmissions.

25. The method of claim 21, further comprising:
    determining that the one or more dynamic grant PUSCH transmissions dynamically scheduled by the DCI message includes one or more new transmissions and one or more retransmissions; and determining a mapping between the one or more new transmissions, the one or more retransmissions, and resources allocated to the one or more dynamic grant PUSCH transmissions.

26. The method of claim 21, further comprising:
receiving radio resource control (RRC) configuration information enabling a dynamic uplink grant autonomous determination mode, wherein the set of scheduling parameters for the one or more dynamic grant PUSCH transmissions is autonomously determined based at least in part on the RRC configuration information.

27. The method of claim 21, wherein the HARQ feedback comprises a bitmap indicating the HARQ feedback for each of the one or more dynamic grant PUSCH transmissions.

28. A non-transitory computer-readable medium storing one or more instructions for wireless communication, the one or more instructions comprising:
one or more instructions that, when executed by one or more processors of a user equipment, cause the one or more processors to:
  receive hybrid automatic repeat request (HARQ) feedback for one or more previous physical uplink shared channel (PUSCH) transmissions, wherein the one or more previous PUSCH transmissions are associated with a set of previous scheduling parameters;
  receive a downlink control information (DCI) message that dynamically schedules one or more dynamic grant PUSCH transmissions;
  autonomously determine a set of scheduling parameters for the one or more dynamic grant PUTSCH transmissions dynamically scheduled by the DCI message, wherein the set of scheduling parameters is not determined based on the DCI message, and wherein the set of scheduling parameters is autonomously determined based at least in part on the HARQ feedback and the set of previous scheduling parameters; and
  transmit the one or more dynamic grant PUSCH transmissions based at least in part on the set of scheduling parameters, wherein uplink control information is multiplexed onto each of the one or more dynamic grant PUSCH transmissions to indicate the set of scheduling parameters autonomously determined for each respective dynamic grant PUSCH transmission of the one or more dynamic grant PUSCH transmissions,
wherein the one or more instructions, when executed by the one or more processors of the user equipment, cause the one or more processors to:
  determine that at least one of the one or more dynamic grant PUSCH transmissions scheduled by the DCI message corresponds to a retransmission of a previous PUSCH transmission based at least in part on the HARQ feedback; and
  autonomously determine the set of scheduling parameters for the retransmission based at least in part on a set of scheduling parameters of the set of previous scheduling parameters associated with the previous PUSCH transmission.

29. An apparatus for wireless communication, comprising:
means for receiving hybrid automatic repeat request (HARQ) feedback for one or more previous physical uplink shared channel (PUSCH) transmissions, wherein the one or more previous PUSCH transmissions are associated with a set of previous scheduling parameters;
means for receiving a downlink control information (DCI) message that dynamically schedules one or more dynamic grant PUSCH transmissions;
means for autonomously determining a set of scheduling parameters for the one or more dynamic grant PUSCH transmissions dynamically scheduled by the DCI message, wherein the set of scheduling parameters is not determined based on the DCI message, and wherein the set of scheduling parameters is autonomously determined based at least in part on the HARQ feedback and the set of previous scheduling parameters; and
means for transmitting the one or more dynamic grant PUSCH transmissions based at least in part on the set of scheduling parameters, wherein uplink control information is multiplexed onto each of the one or more dynamic grant PUSCH transmissions to indicate the set of scheduling parameters autonomously determined for each respective dynamic grant PUSCH transmission of the one or more dynamic grant PUSCH transmissions,
wherein said means for autonomously determining the set of scheduling parameters for the one or more dynamic grant PUSCH transmissions comprising:
means for determining that at least one of the one or more dynamic grant PUSCH transmissions scheduled by the DCI message corresponds to a retransmission of a previous PUSCH transmission based at least in part on the HARQ feedback; and
means for autonomously determining the set of scheduling parameters for the retransmission based at least in part on a set of scheduling parameters of the set of previous scheduling parameters associated with the previous PUSCH transmission.

* * * * *